Sept. 16, 1958    A. W. McDONALD    2,852,271
FOLDABLE STEPS FOR TRAILERS
Filed March 16, 1955    2 Sheets-Sheet 1

INVENTOR.
Albert W. McDonald
BY Nathan N. Kraus
Frank H. Marks
ATTORNEYS

Sept. 16, 1958   A. W. McDONALD   2,852,271
FOLDABLE STEPS FOR TRAILERS
Filed March 16, 1955   2 Sheets-Sheet 2

INVENTOR.
Albert W. McDonald
BY Nathan A. Evans
Frank H. Morke
ATTORNEYS

2,852,271

FOLDABLE STEPS FOR TRAILERS

Albert W. McDonald, St. Petersburg, Fla.

Application March 16, 1955, Serial No. 494,659

5 Claims. (Cl. 280—166)

My invention relates to a novel foldable step particularly adapted for use on automobile trailer vehicles, but of course suitable for other applications wherever the features of such steps may be desirable.

One of the objects of my invention is the provision of a trailer step which is quickly and easily positioned for use, and collapsed and folded under the vehicle when not in use.

Another object of my invention is the provision of a trailer step which is easily moved to its retracted position below the bottom or floor of the trailer, but which is readily extended to operative position and in either position is held against inavdertent displacement.

Another object of my invention is the provision of a multiple-tread step construction of the foregoing character, including a main tread and one or more auxiliary depending treads removably secured to said main tread.

Another object of my invention is the provision of a trailer step which is sturdy, durable and efficient in service, and economical to manufacture.

Other and further objects of my invention will become apparent from the following descrpition when considered in connection with the accompanying drawings, in which—

Figure 1:
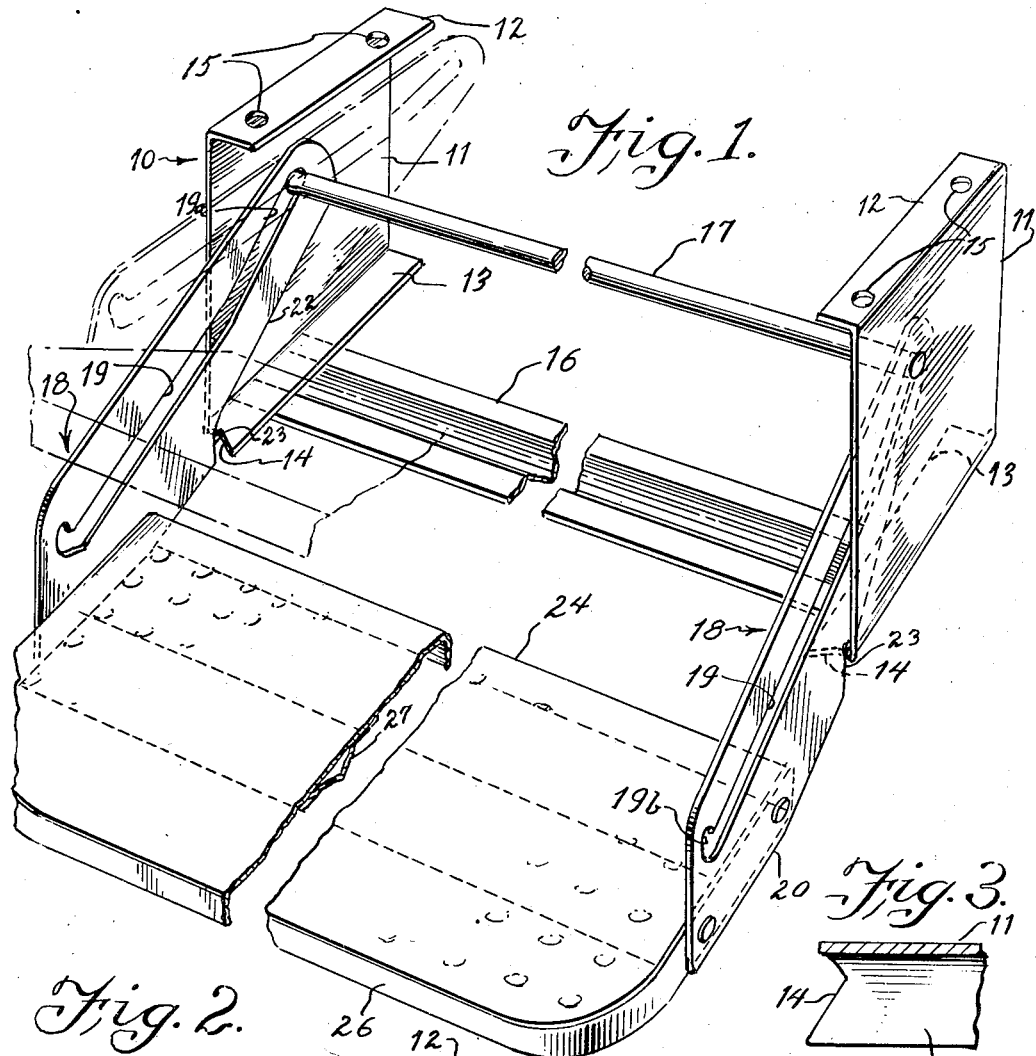
Fig. 1 is a perspective view of a step structure in accordance with my invention.
Figures 2, 3:
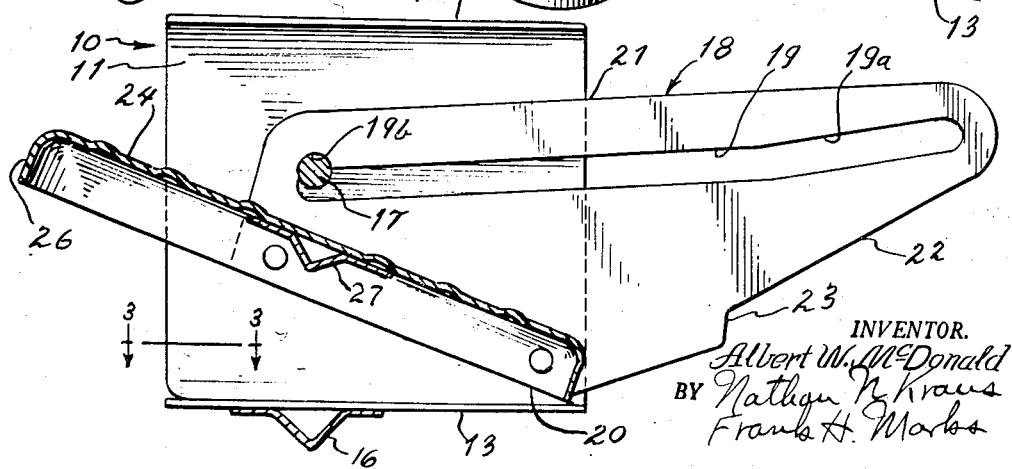
Fig. 2 is a vertical cross-sectional view thereof.
Fig. 3 is a cross-sectional view taken substantially along line 3—3 of Fig. 2.

Referring to the drawings, particularly Figs. 1–3, my invention comprises a pair of spaced complemental brackets 10, each preferably formed of sheet metal in generally channel form and having a vertical web 11, an upper horizontal flange 12 and a lower horizontal flange 13. The upper flange 12 is provided with spaced apertures 15 to receive fastening elements such as screws or bolts, by which the brackets may be attached to the underside of a trailer. The lower flange 13 at its forward edge is provided with a substantially V-shaped recess 14, the point of intersection of the legs thereof being spaced slightly from the vertical web 11, as illustrated clearly in Fig. 3. A brace member 16 is welded to the lower flanges 13 and serves to maintain the brackets 10 in rigid relation. A rod 17 extending transversely of the brackets 10 is welded to vertical webs and serves as a pivotal support for the arms 18 presently to be described. Said arms are identical in construction and are formed preferably of sheet metal, with each arm having a longitudinal slot 19 which is generally at an acute angle with respect to the lower edge 20 of the arm, as will be clearly apparent by reference to Figs. 1 and 2. The slot 19 includes a rear portion 19a which is slightly angular to the main portion of the slot, the forward end of which terminates in an upwardly directed terminal portion 19b. The upper edge 21 of each arm 18 is substantially parallel to the general direction of the slot 19, and the rearward edge 22 of each arm is provided with an intermediate step or shoulder 23. The arms 18 are each permanently rigidly connected at their distal ends to a metal tread 24 provided with peripheral downturned flanges 26, the lower edges of said flanges coinciding substantially with the lower edges 20 of the arms. A V-shaped channel iron 27 provided with outturned flanges is welded to the underside of the tread 24, as shown clearly in Fig. 2, and affords reinforcement to the tread for rigidifying the same. As seen clearly in Fig. 1, the arms 18 are pivotally supported on the transverse rod 17 which passes through the slots 19.

In operative or in use position the parts are in the relation illustrated in Fig. 1, with the rearward ends of the slots 19 abutting the transverse rod 17, and with the shoulders 23 of the arms engaged in respective recesses 14 in the lower flanges 13 of the brackets. The angular edges of the recesses 14 serve to cam the arms 18 to occupy positions at the intersections of the said edges, thereby tending to minimize lateral sway, particularly when a load is applied to the tread. In order to swing the tread from "in-use" to "out-of-use" position, that is, to the position illustrated in Fig. 2, the forward edge of the tread 24 is elevated so that the longitudinal slots 19 are substantially horizontal and the tread and arms are moved rearwardly. Because the rearward portion 19a of each slot is in angular relation to the main portion of the slot, the tread 24 will be caused to be cammed upwardly a slight distance, so that the lower edge of the rearward flange 26 of the tread is caused to clear the lower flanges 13 of the brackets. Further rearward movement of the tread and arms will cause the transverse rod 17 to be received in the forward terminal portions 19b of the slots, as illustrated in Fig. 2, thereby locking the tread in out-of-use position and secure against inadvertent dislodgment. As will be apparent, only a small portion of the tread 24 extends beyond the brackets 11 and in no wise interferes with movement of the trailer vehicle.

When in retracted position, the tread 24 is fulcrumed on the rod 17, the axis of which is then disposed in close proximity to the longitudinal axis of the tread. However, the arms 18 are fulcrumed substantially at their ends and accordingly the arms serve as weights tending to effect revolution of the movable structure in a clockwise direction, as viewed in Fig. 2, so that the rearward flange 26 of the tread is caused to rest on the horizontal flanges 13 of the brackets, thereby ensuring against inadvertent dislodgment of the tread in such retracted position.

When the tread is extended to in-use position, as illustrated in Fig. 1, the rearward edge of the tread is spaced from the plane of the vehicle wall, which coincides substantially with the plane of the forward edges of the brackets, thereby providing a maximum of tread area whereby the whole surface area of the tread may be utilized for its intended function.

Figure 4:
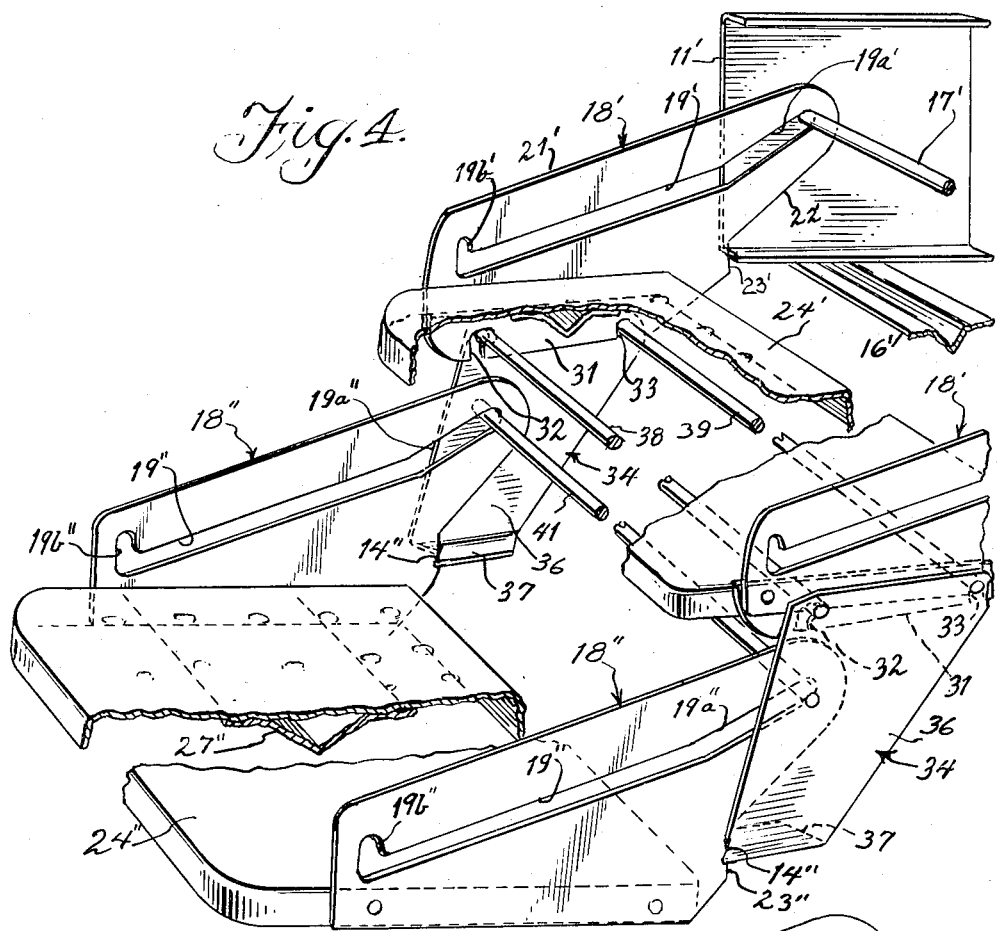
Fig. 4 is a perspective view of a modified embodiment of my invention.
Figure 5:
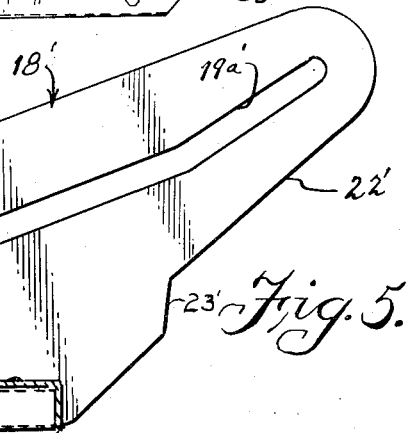
Fig. 5 is an elevational view of a detail of construction illustrated in Fig. 4.

The modified embodiment illustrated in Figs. 4 and 5 shows a multiple-tread arrangement which includes parts similar in construction and operation to those hereinbefore described. Accordingly, throughout the following description identical primed numerals will be used to identify corresponding parts in the modified embodiment. The structure illustrated in Figs. 4 and 5 comprises main bracket 11' and slotted arms 18' supported from rod 17' with a tread 24' rigidly fixed between the arms 18'. Secured along the lower edge of each of the arms 18', as by the rivets which pass through the said arms and the flanges 26' in the tread, is a depending bracket 31 preferably formed of sheet metal and having in its forward portion a substantially L-shaped slot 32 and in its rearward portion a substantially semi-circular slot 33.

An auxiliary tread support assembly comprises a pair of end brackets 34, each including a vertical web portion 36 and a lower integral flange 37, with each flange having a recess 14". A pair of spaced rods 38 and 39 are received in apertures in the vertical webs 36 and are welded therein to effect rigid securement. The said rods are spaced at a distance corresponding to the spacing of the slots 32 and 33 and, as will be seen clearly in Fig. 4, the rods 38 and 39 are arranged to be received with the said slots, whereby the bracket assembly may be secured in depending relation to the arms. A third rod 41 extends across the brackets 34, the ends of the rods being similarly secured in apertures provided in the brackets. The rod 41 passes through slots 19" of the arms 18" of the auxiliary tread assembly and affords pivotal support thereto, the arms 18" and tread 24" being identical in construction with the corresponding structure illustrated in Figs. 1 and 2.

The auxiliary tread and bracket assemblies, which are of course permanently assembled, may be readily attached to or detached from the depending brackets 31 on the main arms 18'. It will of course be understood that the auxiliary tread assembly is intended to be employed where the floor level of the vehicle is of such height that a single tread would not afford the necessary convenience to a user. It is contemplated that the auxiliary tread assembly would be used only when the trailer is at rest and that, before movement of the trailer, the said tread assembly would be detached and stored in some suitable place within the trailer. During such storing, of course, the structure could be collapsed to assume the relative position illustrated in Fig. 2, so as to occupy a minimum of space. Of course, during movement of the trailer the tread 24' would be moved to the retracted position illustrated in Fig. 2.

Various changes coming within the spirit of my invention may suggest themselves to those skilled in the art. Hence, I do not wish to be limited to the specific embodiments shown and described or uses mentioned, but intend the same to be merely exemplary, the scope of my invention being limited only by the appended claims.

I claim:

1. A foldable step structure for vehicles and the like comprising a pair of brackets adapted to be secured to the underside of a vehicle and in spaced relation to each other, each of said brackets including a vertical web and an inwardly directed flange at the bottom edge thereof provided with a cut-out recess at the forward end thereof, guide means extending inwardly from each of said brackets, a pair of arms each associated with a respective bracket adapted to be guided on said guide means adjacent to said vertical web and in alignment with said cut-out recess, each of said arms having a long upper edge and two angularly disposed lower edges, a tread rigidly connected between said arms adjacent to each of the forward lower edges of said arms, and shoulders formed in each of the lower rearward edges of said arms at a greater spacing from the rear end of said long upper edge than from the junction between said lower edges for accommodation within said cut-out recesses and in abutting relation with said first-mentioned flanges.

2. A foldable step structure as set forth in claim 1 wherein said shoulders are disposed substantially vertically in the extended position of said foldable step structure.

3. A foldable step structure for vehicles and the like comprising a pair of brackets adapted to be secured to the underside of a vehicle and in spaced relation to each other, each of said brackets including a vertical web and an inwardly directed flange at the bottom edge thereof provided with a cut-out recess at the forward end thereof, guide means extending inwardly from each of said brackets, a pair of arms each associated with a respective bracket and provided with a longitudinal slot along the main length thereof engaging said guide means for relative movement adjacent to said vertical web and in alignment with said cut-out recess, each of said arms having a long upper edge and two angularly disposed lower edges, a tread rigidly connected between said arms adjacent to each of the forward lower edges of said arms, and shoulders formed in each of the lower rearward edges of said arms at a greater spacing from the rear end of said long upper edge than from the junction between said lower edges for accommodation within said cut-out recesses and in abutting relation with said first-mentioned flanges in the extended position of said foldable step structure, at which time said guide means are disposed at the ends of the longitudinal slots adjacent to the rear ends of said long upper edges, each of said slots having an upwardly extending terminus at the opposite ends thereof for engaging said guide means in the nested position of said foldable step structure to secure the step against inadvertent dislodgement.

4. A foldable step structure as set forth in claim 3 wherein said pairs of arms are of uni-planar sheet metal of identical construction.

5. A foldable step structure for vehicles and the like comprising a first pair of brackets adapted to be secured to the underside of a vehicle and in spaced relation to each other, each of said brackets including a vertical web and an inwardly extending flange along the lower edge thereof, a first pair of arms each associated with a respective bracket, a first tread rigidly connected to said arms, each of said arms having an elongated slot therein, fixed means extending inwardly from each of said webs and passing through respective slots to afford slidable pivotal support for said arms, each of said arms having a shoulder formed in a lower edge thereof arranged to engage the forward edge of a lower flange when said arms are extended outwardly, a second pair of brackets each including a vertical web and an inwardly extending flange along the lower edge thereof, cooperating means on said second brackets and said first arms detachably securing said second brackets to said first arms, a second pair of arms each connected to one of said second brackets, a second tread rigidly connected to said second pair of arms, each of said second pair of arms having a shoulder formed in a lower edge thereof for engagement with the forward edge of a respective flange of said second pair of brackets for supporting said second pair of arms and tread in operative position.

References Cited in the file of this patent

UNITED STATES PATENTS

| | | |
|---|---|---|
| 2,209,576 | McDonald | July 30, 1940 |
| 2,493,639 | Pellegrini | Jan. 3, 1950 |
| 2,533,050 | Runyen | Dec. 5, 1950 |
| 2,678,831 | Fisher | May 18, 1954 |
| 2,747,888 | Jones | May 29, 1956 |